United States Patent [19]

Dunn

[11] Patent Number: 5,060,461
[45] Date of Patent: Oct. 29, 1991

[54] SEMI-HOVER CYLINDER MOWER

[75] Inventor: Kenneth Dunn, Mowden Park, United Kingdom

[73] Assignee: Electrolux Northern Limited, Durham, United Kingdom

[21] Appl. No.: 541,915

[22] Filed: Jun. 21, 1990

[30] Foreign Application Priority Data

Jun. 22, 1989 [GB] United Kingdom ............... 8914325

[51] Int. Cl.$^5$ .......................................... A01D 35/00
[52] U.S. Cl. ..................................... 56/13.3; 56/13.4
[58] Field of Search ................ 56/12.8, 5, 13.3, 13.4, 56/17.1, 184, 156, 194, 197, 199, 200, 203, 302.2

[56] References Cited

U.S. PATENT DOCUMENTS

| | | | |
|---|---|---|---|
| 3,054,247 | 9/1962 | Roesler | 56/13.4 |
| 3,673,773 | 7/1972 | Ferguson | 56/13.3 |
| 3,846,963 | 11/1974 | Pedigo | 56/13.3 |
| 4,328,661 | 5/1982 | Ferguson | 56/13.4 |

Primary Examiner—Thuy M. Bui
Attorney, Agent, or Firm—Pearne, Gordon, McCoy & Granger

[57] ABSTRACT

An electrically or petrol driven cylinder mower comprises a mower body 101 and a grass box. An electric motor or petrol engine drives a cutter assembly 202, and also a turbo fan drawing air through an opening 207, both mounted in the body. The grass box has a mouth 204 over the cutters and an opening 302 which mates with the opening 207 in the mower body, and through which the turbo fan sucks air from the cutting region through the grass box.

The air from the turbo fan is discharged within a skirt on the underside of the mower body to assist in supporting the mower above the ground. This skirt, and the land wheels and rear roller, lie behind the cutters, so as to avoid flattening the grass before it reaches the cutters. The land wheels are preferably inset, so that they run only on cut grass.

4 Claims, 6 Drawing Sheets

SEMI-HOVER CYLINDER MOWER

The present invention relates to mowers and in particular to cylinder mowers in which grass cuttings are transferred to a grass box by an airstream generated by a fan.

According to the present invention, there is provided a cylinder mower having a grass box and a fan for transferring grass cuttings from the cutters to the grass box, in which the cutter assembly is adjustable for height with respect to the body of the mower, and support means for supporting means for supporting the body of the mower relative to the ground, the support means including a rear roller or land wheels, a forward roller or land wheels, and a skirt surrounding a major part of the underside of this body and extending in proximity to the ground and into which air from the fan is discharged, the support means lying wholly to the rear of the cutters.

A lawn mower according to the invention will now be described with reference to the accompany drawings, in which.

Figure 1:
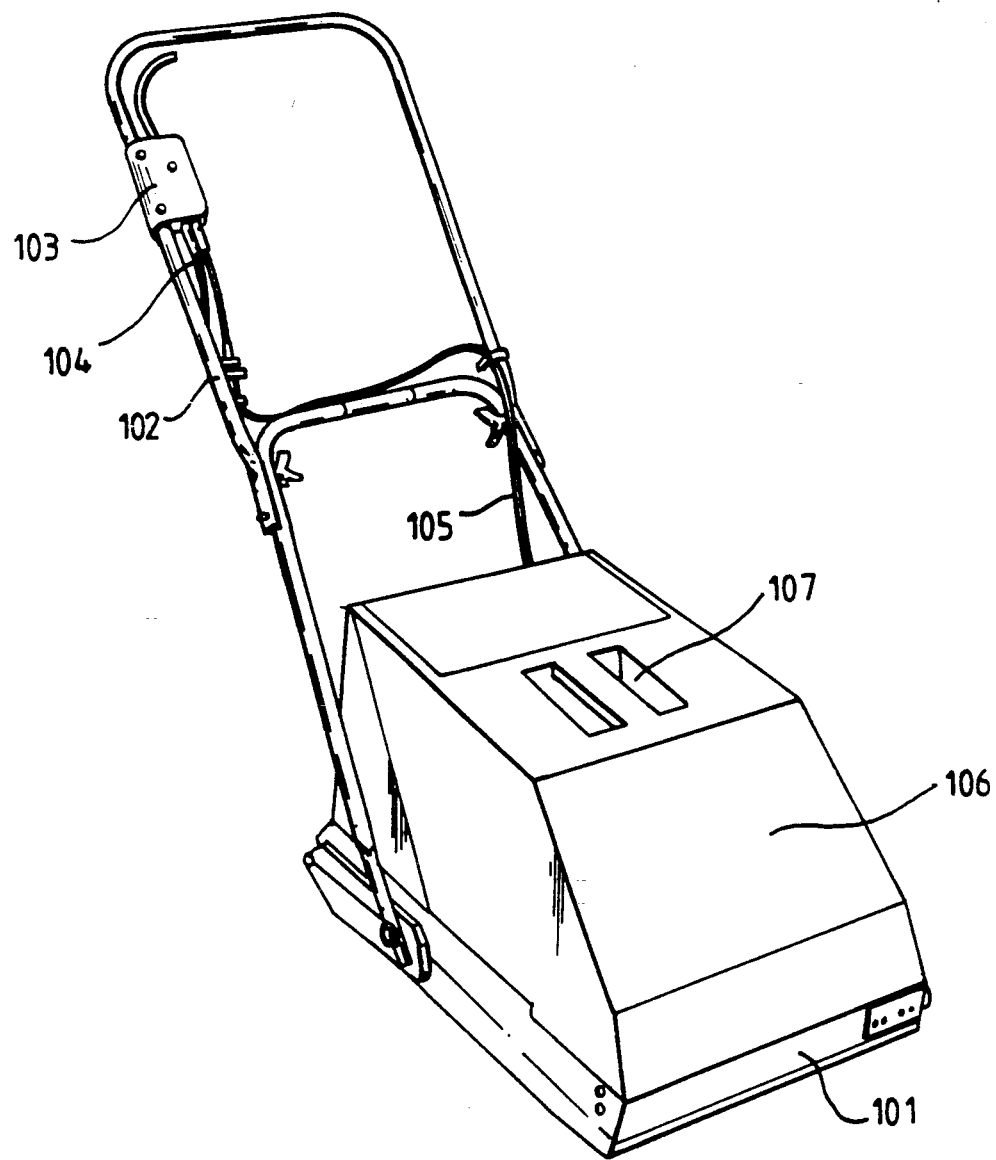
FIG. 1 is an overall perspective view of the mower.

FIG. 1 is a general view of the mower with the grass box in position. The mower comprises a body 101 with a fold-down handle 102 provided with a switch 103 having an operating handle, and from which extend leads 104 for connection to an electric supply, and 105 for supplying current to the motor which drives the cutter cylinder.

A grass box 106 fits on top of the mower body and is provided with a handle 107 so that it can easily be lifted off for emptying or for access to the top of the mower body.

Figure 2:
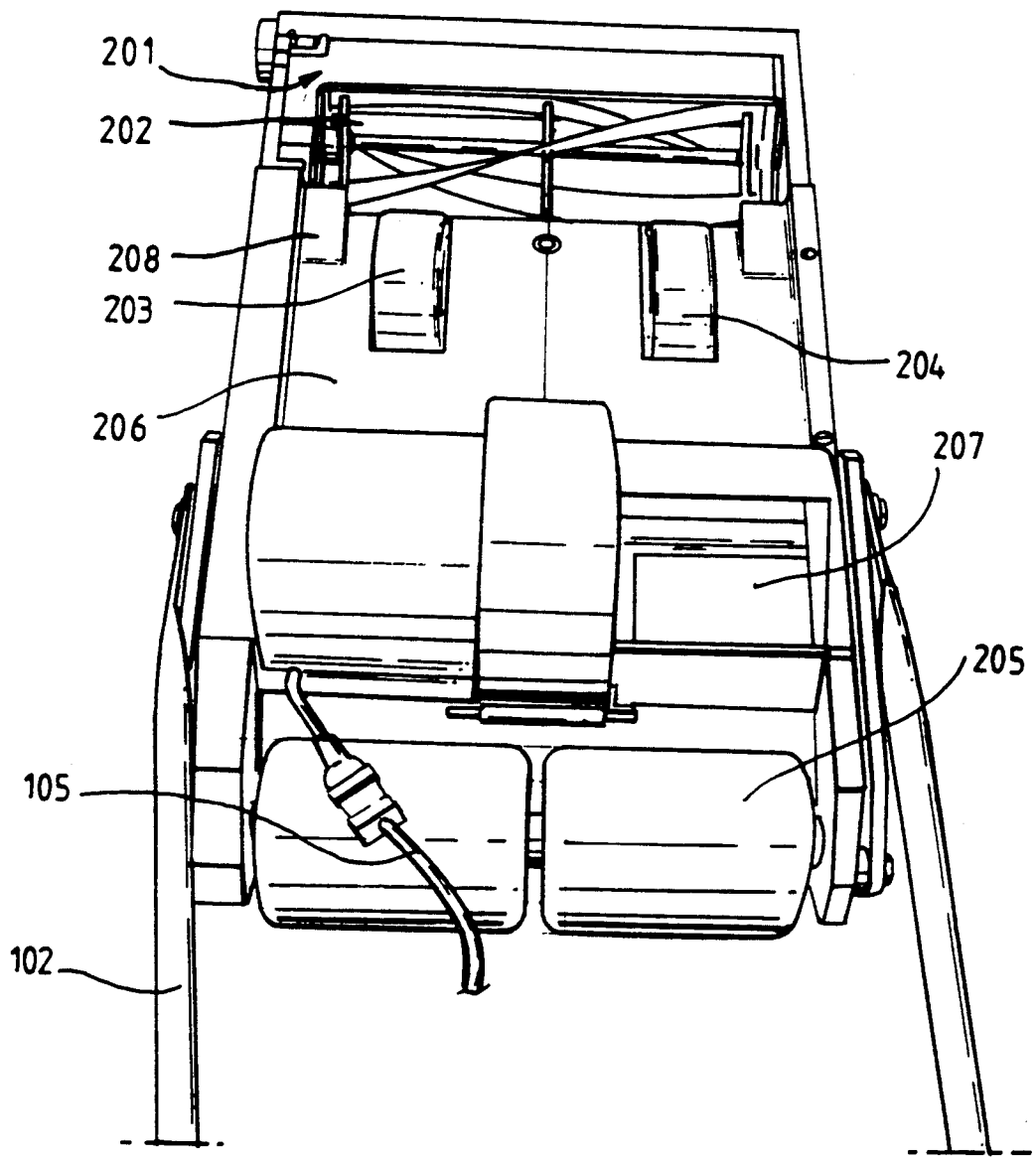
FIG. 2 is a top view of the mower body with the grass box removed.

FIG. 2 is a view of the mower body from the top, seen from the operator's position, the grass box having been removed.

The body of generally rectangular outline, and at the front is a rectangular aperture 201 within which is fitted the cutter assembly 202. The cutter assembly is a separate unit which is removable, and which, when in position, can be adjusted with respect to the body to vary the cutting height. The cutter assembly is described more fully below, and in our pending patent application Ser. No. 89.14324.2.

The mower body is supported from the ground partly by a pair of land wheels 203,204 and partly by a split rear roller 205. The land wheels 203, 204 are placed behind the cutter assembly and are inset so as to be within the width of the cutters, with the result that they run only on the cut surface of the grass, and do not flatten grass which has not yet been mown. The land wheels are shown on fixed axles, but they may be mounted on casters for ease of manoeuvreing, or may be replaced by one or more rollers.

Between the wheels 203,204 and the rear roller 205 is a housing 206, the cover of which is hinged to give access for cleaning and maintenance. The power lead 105 supplies power to a motor within this housing and which is not visible in the Figure, the shaft of which carries at its outer end a grooved drive pulley and at its inner end a turbo fan. The opposite side of the housing has an opening 207 which mates with a corresponding opening in the underside of the grass box when this is placed in position. This opening provides an air inlet for the turbo fan, so that the fan in operation draws air through the grass box. A further housing 208 accommodates the drive belt which couples the drive pulley to the cutting cylinder.

Figure 3:
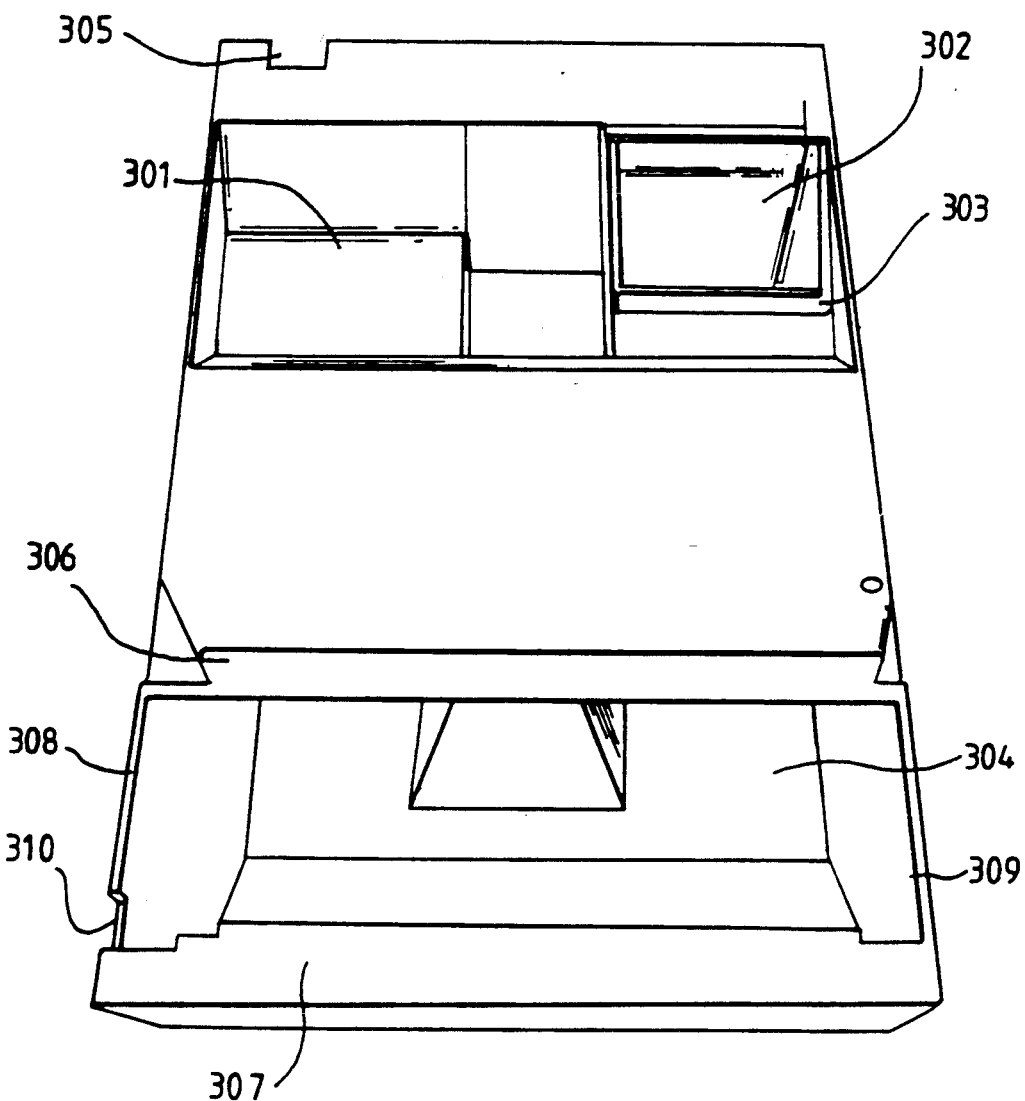
FIG. 3 shows the underside of the grass box.

FIG. 3 is a view of the grass box from the underside. It has a lower surface with a recess 301, conforming in shape to the housing 206, and an opening 302 which mates with the opening 207 in the housing 206. A gasket of foam plastic material 303 round this opening seals it against the entry of outside air, and a duct within the grass box extends towards the top, so that air is drawn from above the level of the cuttings in the grass, box and grass is not drawn through in quantities sufficient to clog the turbo fan. For the same purpose a grid (not shown in the drawing) may be fitted loosely in the aperture 302.

The front end of the grass box is formed with a mouth 304, fitting over the top of the aperture 201 in the mower body which houses the cutter assembly, and which in operation allows air and grass cuttings to be drawn into the grass box by the suction created by the turbo fan. A notch 305 allows for the passage of the motor supply lead 105 from the switch on the handle.

Projecting flanges 306,307 assist in sealing the junction of the grass box mouth with the top of the cutter assembly aperture, and also locate the front end of the grass box with respect to the body. The rear portion of the grass box is located against the ends of the housing 206 by the end walls 308,309 of the recess 301.

A cut-out 310 at the corner of the mouth accommodates a locking device for the cutting height adjustment which will be described in more detail with reference to FIG. 6.

Figure 4:
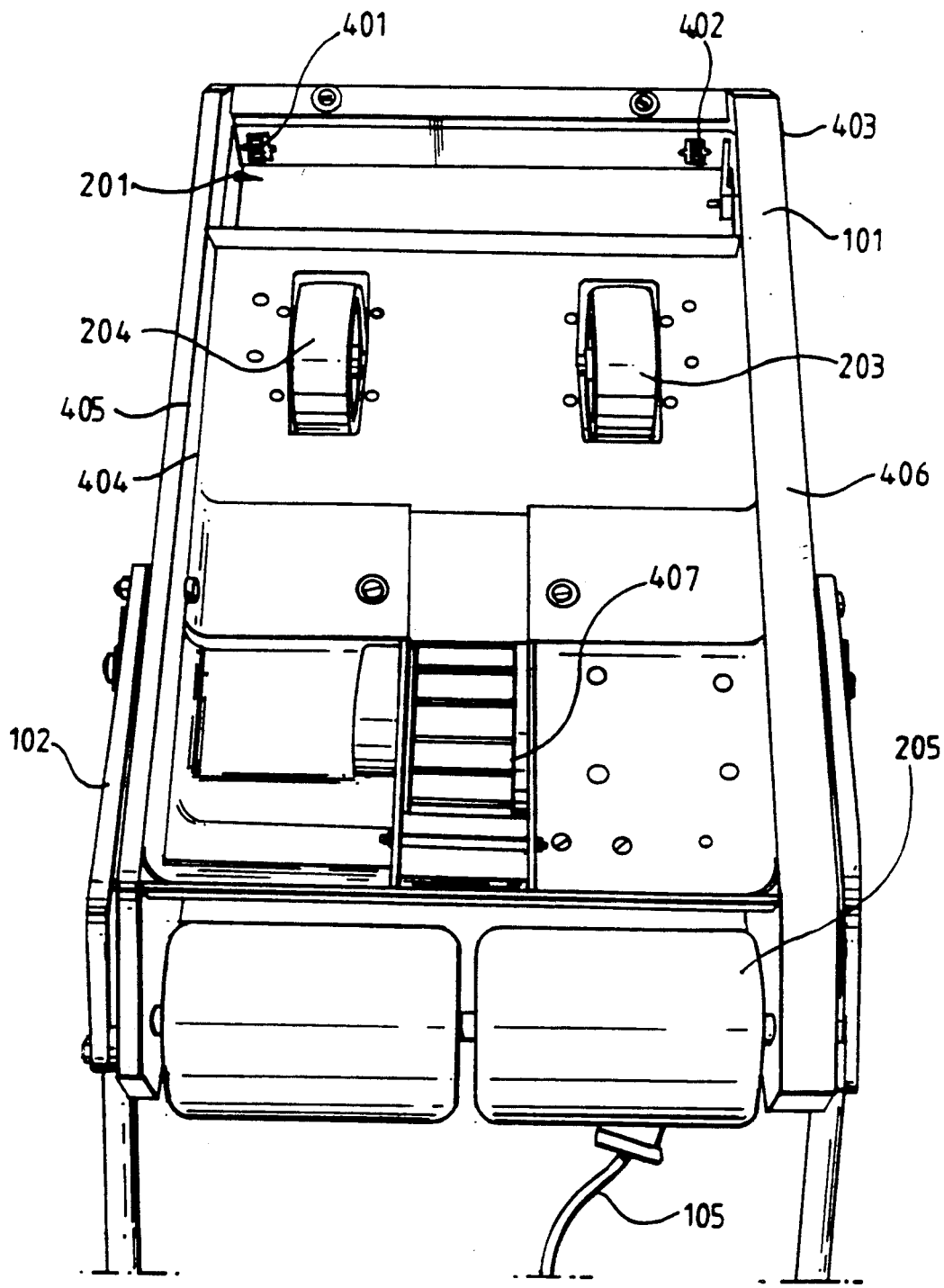
FIG. 4 shows the underside of the mower body, the cutter assembly having been removed.

FIG. 4 shows the underside of the mower body with the cutter assembly removed. This view shows the land wheels 203,204, the rear roller 205, and the cutter assembly aperture 201. Within the aperture 201 is a pair of toothed wheels 401,402 which engage toothed segments on the cutter assembly, enabling its position to be adjusted and so the height of cut to be varied. These toothed wheels are mounted on a shaft rotatable by an adjusting knob 403.

The major part of the mower body underside between the rear roller 205 and the aperture 201 is enclosed by a skirt 404, comprising a strip running along the insides of the side members 405,406 of the body, and across its width in front of the rear rollers and behind the cutter assembly aperture. This skirt extends down almost to ground level.

The turbo fan 407 exhausts the air which it has drawn through the grass box into the space within this skirt, and in operation the raised pressure within the skirt assists in supporting the mower from the ground, reducing the load on the land wheels and rear roller, and so making the mower easier to manoeuvre.

Figure 5:
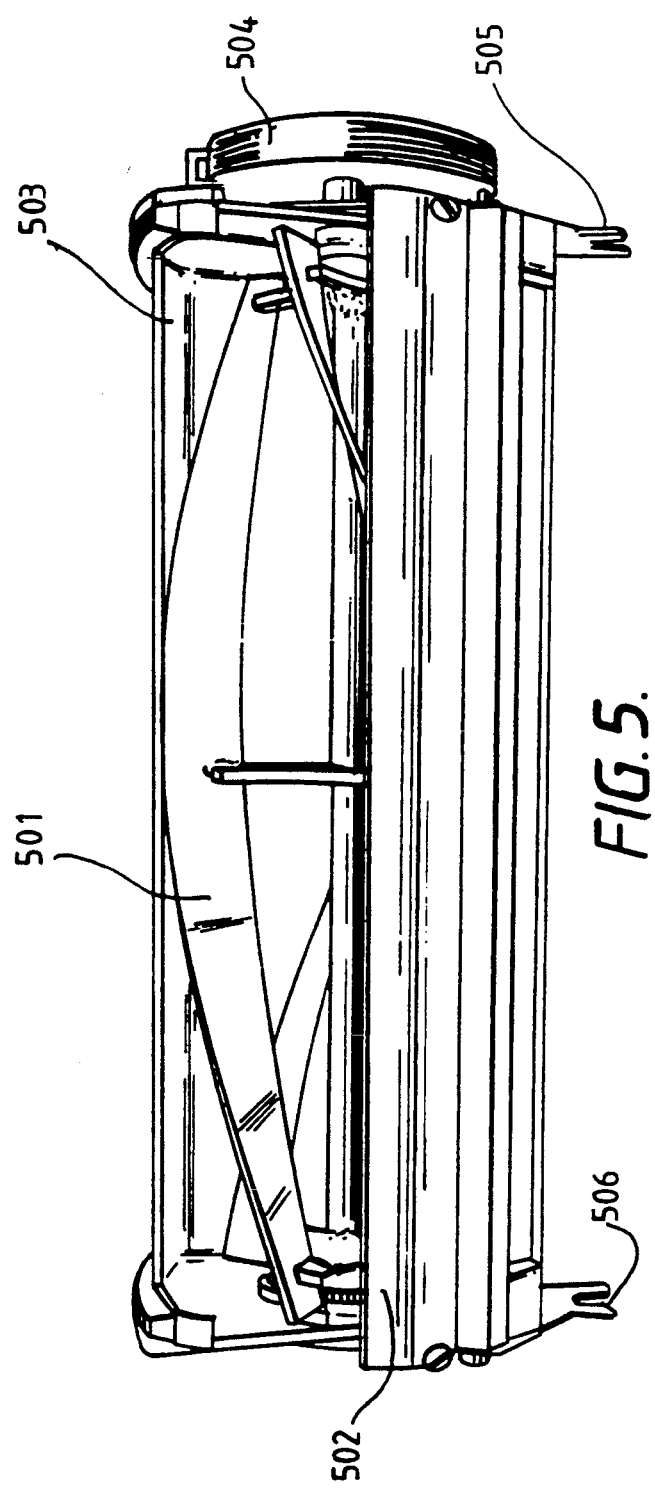
FIG. 5 is a view of the cutter assembly.

FIG. 5 is a view of the cutter assembly seen from the underside. The assembly consists of a cutting cylinder 501 having helical blades of conventional form, and a fixed blade 502. A shield 503 limits the ingress of air from the side of the cutter and helps direct the grass upwards into the mouth of the grass box. The cylinder shaft carries a drive wheel 504 which is driven from the pulley on the shaft of the motor driving the turbo-fan.

The cutter assembly is adjustable for height with respect to the mower body, so that the mower body travels over the ground at a constant height, irrespective of the setting of depth of cut.

A pair of forked projections 505,506 extend from the points near the ends of the cutter assembly and bear, when the assembly is in position, against pins or rods within the cutter assembly aperture, allowing the assembly to have some rotational movement about these pins or rods for height adjustment.

Figure 6:
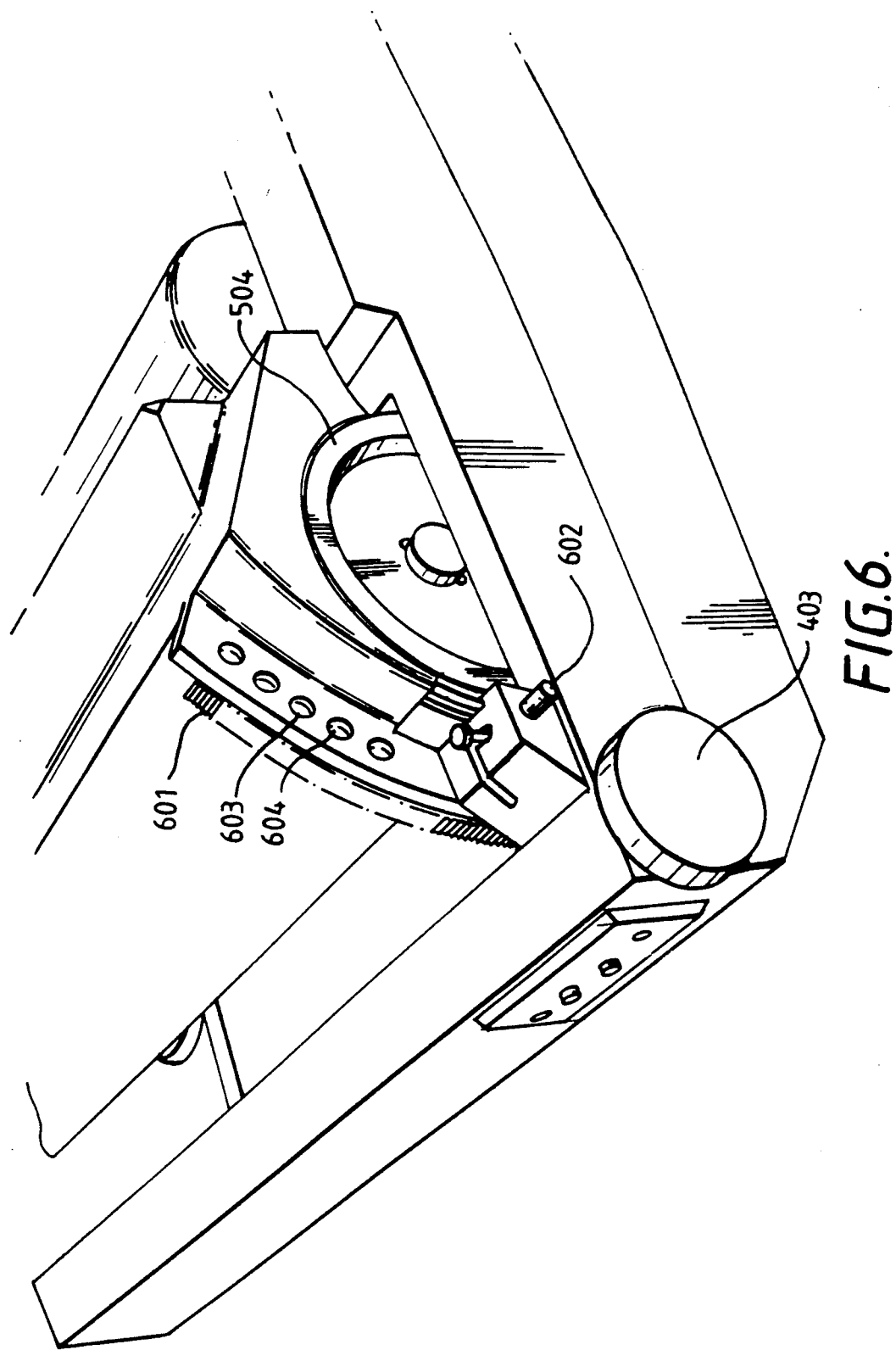
FIG. 6 is a detail of a corner of the mower body and one end of the cutter assembly showing the means of adjusting the cutting height.

FIG. 6 is a fragmentary view of the mower, showing the cutter assembly located in its aperture, but raised considerably above its normal operating position so as to show details of the height adjustment more clearly.

The drive pulley 504 engages a drive belt passing over a pulley within the body and the forks 505, 506 bear against the axle of this pulley or against pins lying along its axis. The cutter assembly is supported between these forks and the toothed wheels 401,402, which engage toothed segments, one of which, 601, is visible in the Figure. The toothed wheels are rotated by means of the adjusting knob 403 to raise or lower the cutter assembly, and this adjustment causes the cutter assembly to pivot about the pins coaxial with the pulley on which the drive belt runs so that the drive pulley 504 always remains in engagement with this belt throughout the adjustment.

A locking bolt 602 on the mower body may be engaged in any one of a series of holes 603,604 etc. on the toothed segments 601 to lock it in the desired operating position.

The removable cutter assembly described above is the subject of our pending patent application Ser. No. 89.14324.2 and a preferred form of belt drive to the pulley 504 is described in our pending patent application Ser. No. 89.14323.4.

In operation of the mower the turbo fan produces considerable suction in the grass box, and consequently at the region where cutting is taking place. This helps to hold the grass immediately in front of the cutters upright, so that it is more readily engaged by the fixed blade of the cutters, and it also removes the cut grass from the region of the cutters, so that it does not tend to clog the cutters or add unnecessarily to the load on them by falling back and being cut a second or third time. The grass borne in the airstream into the grass box is deposited there, where the velocity is slowed by the increased cross section offered to the airstream entering the grass box after which the air passes through the turbo fan and is ejected within the skirt under the mower, assisting to support it, and so reducing the load on the land wheels and roller, and easing the progress of the mower, so that it has less tendency to dig in, or to lift and skim over the uncut grass.

It will be appreciated that the cutter assembly is completely removable. It may therefore be replaced by alternative equipment, for example a fertilizer distributer, a scarifier, a brush for gathering fallen leaves, or any other device suitable for treating the surface of a lawn or path. Further, the cutter assembly may be removed to create a vacuum refuse collector.

I claim:

1. A cylinder mower comprising a body, a cutter assembly including at least one cutting blade disposed transversely of the mower, a grass box and a fan for transferring grass cuttings from the cutter assembly to the grass box, in which the cutter assembly is adjustable for height with respect to the body of the mower, and support means for supporting the body of the mower relative to the ground, the support means including rotatable support members mounted on the body and a skirt depending from the body to surround a major part of the body and extending in proximity to the ground and into which air from the fan is discharged, the support means lying wholly to the rear of the cutters relative to the normal direction of movement of the mower.

2. A cylinder mower according to claim 1 in which the rotatable support members are selected from the group consisting of wheels and rollers, in which said members are disposed within a dimension defined by the longitudinal extent of the cutter assembly.

3. A cylinder mower according to claim 1 or claim 2 in which the support means further comprises a rear roller divided into at least two cylindrical parts and a pair of forward land wheels.

4. A cylinder mower according to claim 3 in which the forward land wheels are mounted within the skirt.

* * * * *